Patented June 10, 1947

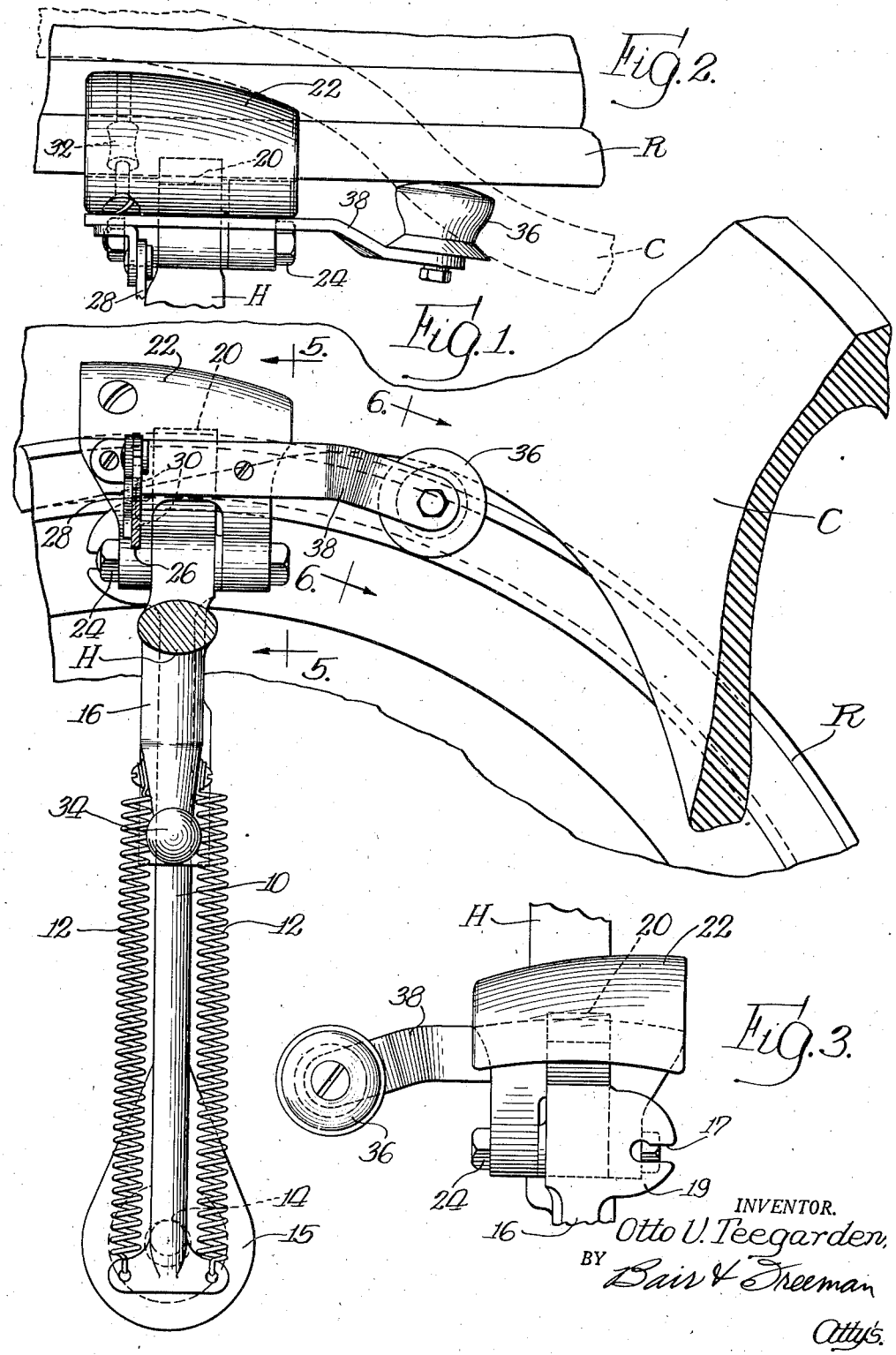

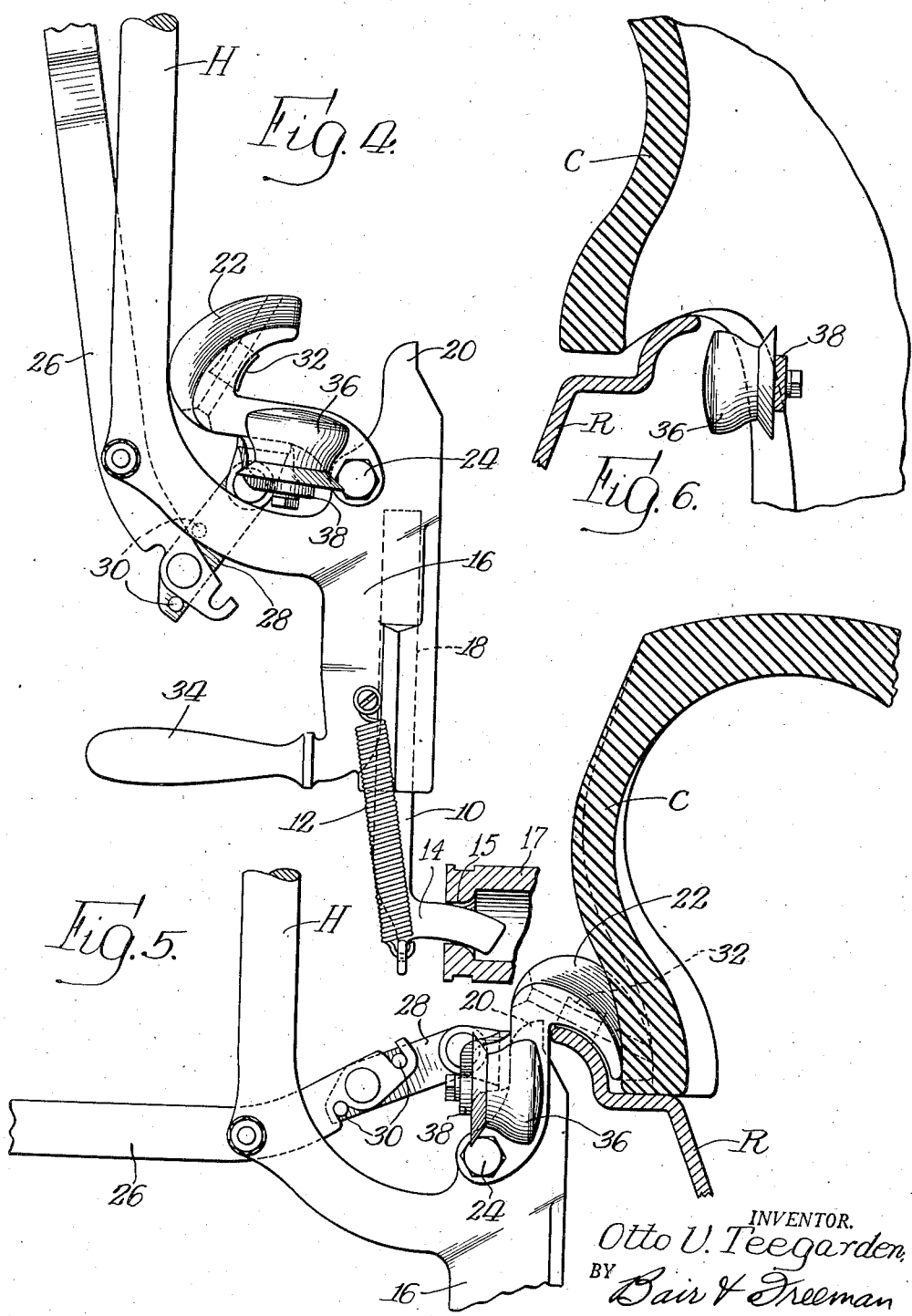

2,421,856

UNITED STATES PATENT OFFICE 2,421,856

TIRE REPLACING TOOL

Otto V. Teegarden, Goshen, Ind.

Application June 27, 1944, Serial No. 542,267

4 Claims. (Cl. 157—6)

My present invention relates to a tire replacing tool particularly adapted for use in connection with a tire stand of the character shown in my copending application, Serial No. 492,684, filed June 29, 1943.

One object of the invention is to provide a simple tire replacing tool which minimizes the effort required to replace the tire casing on a drop center rim.

Another object is to provide a tire replacing tool that has a rim engaging shoe to guide a tire bead into position in the channel of the rim and has a roller in advance thereof for lifting the bead over the rim and delivering it to the shoe.

Another object is to provide a tool of this character having a telescopic arrangement with springs tending to shorten the tool to adjust it to different size rims and so that when one end of it is pivotally associated with the center of the rim, the rim engaging shoe will be biased to remain in contact with the periphery of the rim during operation of the tool.

Another object is to provide a tool which can also be used for tire removing operations as disclosed in my copending application Serial No. 503,174, filed September 21, 1943, and which, when so used, may be adjusted so that the rim engaging shoe is out of the way but still permits use of the shank and handle with their telescoping connection and permits free and unhampered association of the shank and handle with the tool of said last mentioned copending application.

Still another object is to provide a toggle lever for adjusting the rim engaging shoe to either its rim engaging position or an out-of-the-way position and for locking it in the rim engaging position.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of my tire replacing tool showing it being used for replacing a tire casing on a rim, the handle of the tool being broken away at the sectioned portion.

Figure 2 is a plan view of Figure 1.

Figure 3 is a reverse view of Figure 1 showing only a portion thereof.

Figure 4 is a front elevation of Figure 1 showing the rim engaging shoe tipped to an out-of-the-way position.

Figure 5 is a similar view showing the shoe in rim-engaging position and a section through the rim and tire casing as on the line 5—5 of Figure 1, and Figure 6 is a sectional view on the line 6—6 of Figure 1.

On the accompanying drawings I have used the reference character R to indicate a tire rim and C a tire casing. My tire replacing tool includes a handle H and a shank 10 which are telescopically associated with each other. A pair of springs 12 tend to shorten the shank and handle of the tool. The shank 10 has a hooked end 14 to engage in an opening 15 of a wheel supporting post 17 at substantially the center of the rim as disclosed in my first mentioned copending application whereby a pivotal mounting for the tool is had. The handle H has a head 16 including a bore 18 in which the shank 10 is slidably and non-rotatably mounted. The head 16 has an upper end 20 adapted to engage the side of the rim R during use of the tool here disclosed when used in connection with a tire removing tool as shown in my second mentioned copending application.

For tire replacing purposes, a rim engaging shoe 22 is provided which is pivotally mounted at 24 on an axis substantially parallel to the plane of the rim R. This shoe may be swung to the out-of-the-way position shown in Figure 4 by means of a toggle lever 26—28 during the tire removing operations. During tire replacing operations it may be swung to the rim-engaging position of Figure 5 by the toggle lever whereupon stop pins 30 limit the movement of the toggle lever to slightly past center, thus locking the shoe 22 in rim-engaging position.

The rim engaging shoe 22 carries a roller 32 to engage the periphery of the rim R opposing the pull of the springs 12. When using the tool, the hooked end 14 of the shank 10 is engaged in the opening 15 of the post 17 and the handle H together with a knob 34 thereof, are grasped for the purpose of pulling the head 16 outwardly and hooking the shoe 22 on the rim as shown in Figure 5. The springs thereafter keep the roller 32 in engagement with the rim while the tool is rotated for replacing the tire casing C.

A roller 36 is also carried by the shoe 22 as by journaling it on an arm 38 attached to the shoe. This roller engages the bead of the tire casing as shown in Figures 1 and 6 for lifting the bead over the rim and delivering it against the shoe 22 progressively as the tool is rotated in a clockwise direction in Figure 1. The tire casing is thereby replaced within the channel of the rim by merely rotating the tool around the rim after the casing has been manually inserted at one point and the shoe 22 hooked onto the rim at that point.

My tire replacing tool facilitates the replacing of a tire casing on a rim with a minimum of operations for adjusting the tool and for causing it to effect its tire replacing function. At the same time the tool is usable in connection with a tire removing tool of the character shown in my second co-pending application, which tire removing tool is connected by a stud entering a slot 17 in an ear 19 of the head 16, and with the tire replacing shoe 22 adjusted to an out-of-the-way position at that time, as shown in Figure 4. Friction has been reduced to a minimum by the use of the rollers 32 and 36 and these are positioned in relation to the rim R and the shoe 22 to efficiently deliver the bead over the rim to the shoe in a most effective manner so that the shoe can permit the bead to drop into the channel of the rim in the desired position.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a tire replacing tool, a shank having one end adapted for pivotal mounting relative to the center of rotation of the tire rim, a handle telescopically mounted on said shank, spring means tending to shorten the telescopic connection, a rim engaging shoe mounted on said handle for hooking on the tire rim, said rim engaging shoe having roller means engaging a portion of the outer periphery of the rim against the bias of said spring means, said portion sloping toward the lateral center of the rim and said roller means substantially fitting said sloping portion of the rim, and a roller carried by said handle in advance of said rim engaging shoe for engaging the tire bead and lifting it over the rim and delivering it against said shoe.

2. A tire replacing tool comprising a shank having one end adapted for pivotal mounting relative to the center of rotation of the tire rim, a handle mounted on said shank, a rim engaging shoe on said handle, roller means carried thereby for engaging the outer periphery of the rim and a roller carried by said handle in advance of said rim engaging shoe for engaging the inner periphery of a tire bead and lifting it over the rim and delivering it against said shoe, said last roller having an enlarged head on the end thereof located at the side of said rim and a flange on the opposite end thereof between which head and flange the bead of the tire travels during such delivery of the bead against said shoe.

3. A tire replacing tool of the character disclosed, a shank having one end adapted for pivotal movement relative to the center of rotation of the tire rim, a handle for said shank, a rim engaging shoe swingably mounted on said handle for movement to either a position hooked over the tire rim or to an out-of-the-way position, and a toggle lever connection between said rim engaging shoe and said handle to move it to either of said positions and to lock it in the rim engaging position.

4. In a tire tool, a pair of telescopically mounted elements, spring means tending to shorten the length thereof, one of said elements being pivotally mounted adjacent the center of rotation of the tire rim and the other having a rim engaging shoe, and a roller carried by said shoe for engaging that portion of the periphery of the rim which slopes toward the lateral center of the rim to keep the shoe outward in opposition to said spring means and against lateral dislocation from the tire rim.

OTTO V. TEEGARDEN.

REFERENCES CITED

The following references are of record in the file of this patent:

UNITED STATES PATENTS

| Number | Name | Date |
|---|---|---|
| 1,547,544 | Wertz | July 28, 1925 |
| 834,908 | Hussey | Nov. 6, 1906 |
| 965,076 | Carle | July 19, 1910 |
| 1,025,987 | Long | May 14, 1912 |
| 1,587,634 | Dickey et al. | June 8, 1926 |
| 2,319,377 | Wallace et al. | May 18, 1943 |

FOREIGN PATENTS

| Number | Country | Date |
|---|---|---|
| 260,823 | Germany | June 10, 1913 |